Jan. 31, 1967 W. O. DOUD ETAL 3,301,382
GLASSWARE AND CARTON HANDLING APPARATUS
Filed Aug. 5, 1963 5 Sheets-Sheet 1

INVENTORS.
WILBUR O. DOUD
CHARLES W. COOK
BY Arthur L. Urban
ATTORNEY.

Jan. 31, 1967 W. O. DOUD ETAL 3,301,382
GLASSWARE AND CARTON HANDLING APPARATUS
Filed Aug. 5, 1963 5 Sheets-Sheet 2
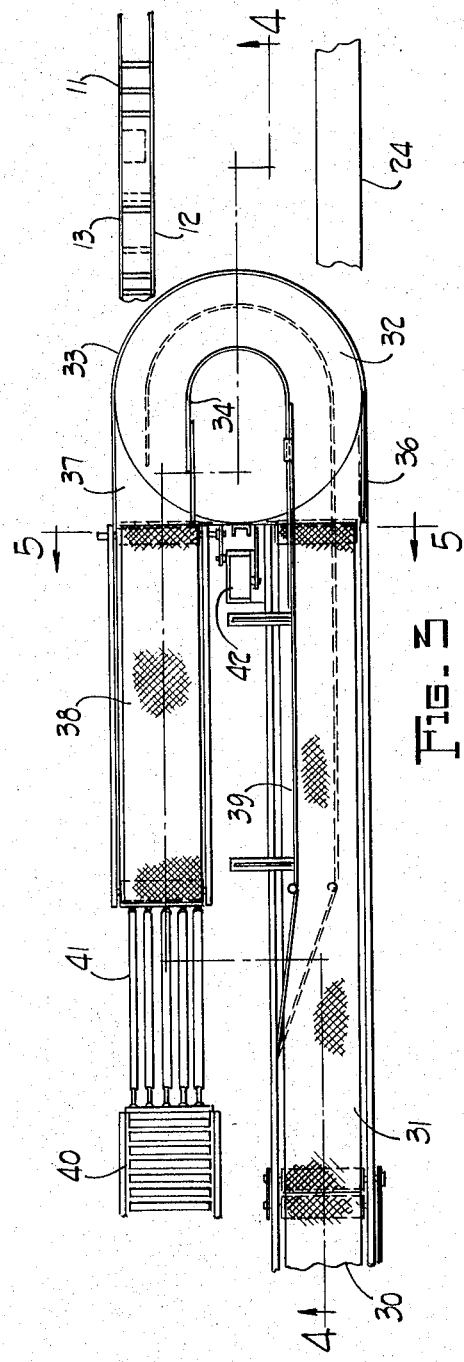
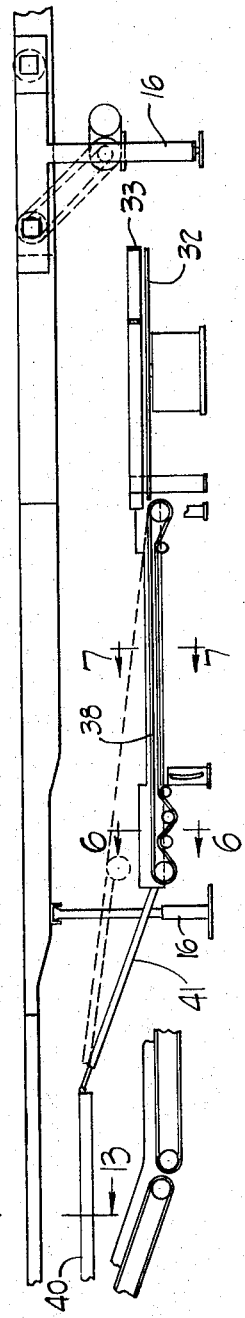
INVENTORS.
WILBUR O. DOUD
CHARLES W. COOK
BY Arthur L. Urban
ATTORNEY.

INVENTORS.
WILBUR O. DOUD
CHARLES W. COOK
BY Arthur L. Urban
ATTORNEY.

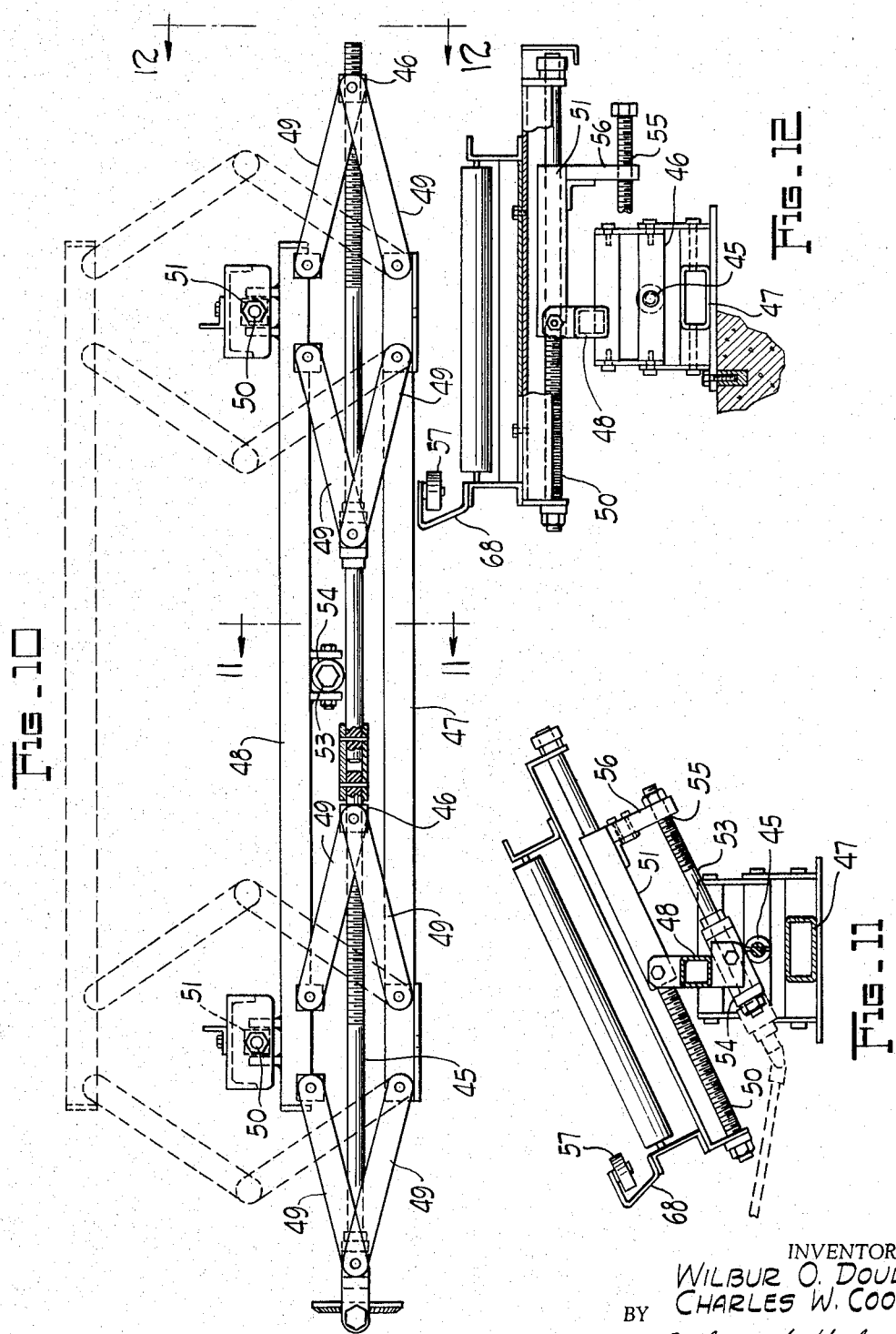

Jan. 31, 1967   W. O. DOUD ETAL   3,301,382
GLASSWARE AND CARTON HANDLING APPARATUS
Filed Aug. 5, 1963   5 Sheets-Sheet 5

INVENTORS
WILBUR O. DOUD
CHARLES W. COOK
BY Arthur L. Urban
ATTORNEY.

United States Patent Office 3,301,382
Patented Jan. 31, 1967

3,301,382
GLASSWARE AND CARTON HANDLING APPARATUS
Wilbur O. Doud and Charles W. Cook, Muncie, Ind., assignors to Ball Brothers Company, Incorporated, Muncie, Ind., a corporation of Indiana
Filed Aug. 5, 1963, Ser. No. 299,868
7 Claims. (Cl. 198—75)

This invention relates to a new and improved method and apparatus for handling glassware and cartons therefor, and more particularly relates to a novel method and apparatus for handling glasswear and cartons during the inspection of the ware and the packing thereof into the cartons.

Glassware, such as bottles and jars, is generally manufactured by shaping ware on forming machines and then passing the newly formed ware through an annealing lehr on a moving conveyor. In the past, ware discharged from the lehr was inspected and packed by a number of persons positioned around the discharge end of the lehr conveyor. However, recent increases in the production speeds of glass forming and annealing equipment have made it extremely difficult to achieve adequate inspection by such an arrangement due to a lack of space for the larger number of inspecting packers which would be required at such increased speeds.

In view of the above and other difficulties and shortcomings in the handling of glassware and cartons during inspection and packing heretobefore, it was completely unexpected and totally surprising to discover a new and improved method and apparatus which facilitates the inspection and packing of glassware and provide a high degree of flexibility in such operations. Furthermore, the method and apparatus of the invention permit a substantial reduction in the number of persons required to achieve satisfactory inspection. In addition, the apparatus affords troublefree operations at high rates of speed over long periods of time.

Other advantages and benefits of the method and apparatus of the present invention will be apparent from the following description and drawings in which:

FIGURE 3 is a plan view of a portion of the apparatus of the invention;

FIGURE 4 is a sectional view taken along line 4—4 of FIGURE 3;

FIGURE 10 is an enlarged side elevation of a portion of the apparatus of the invention;

FIGURE 11 is a sectional view taken along line 11—11 of FIGURE 10;

FIGURE 12 is a view taken along line 12—12 of FIGURE 10;

Figure 1:
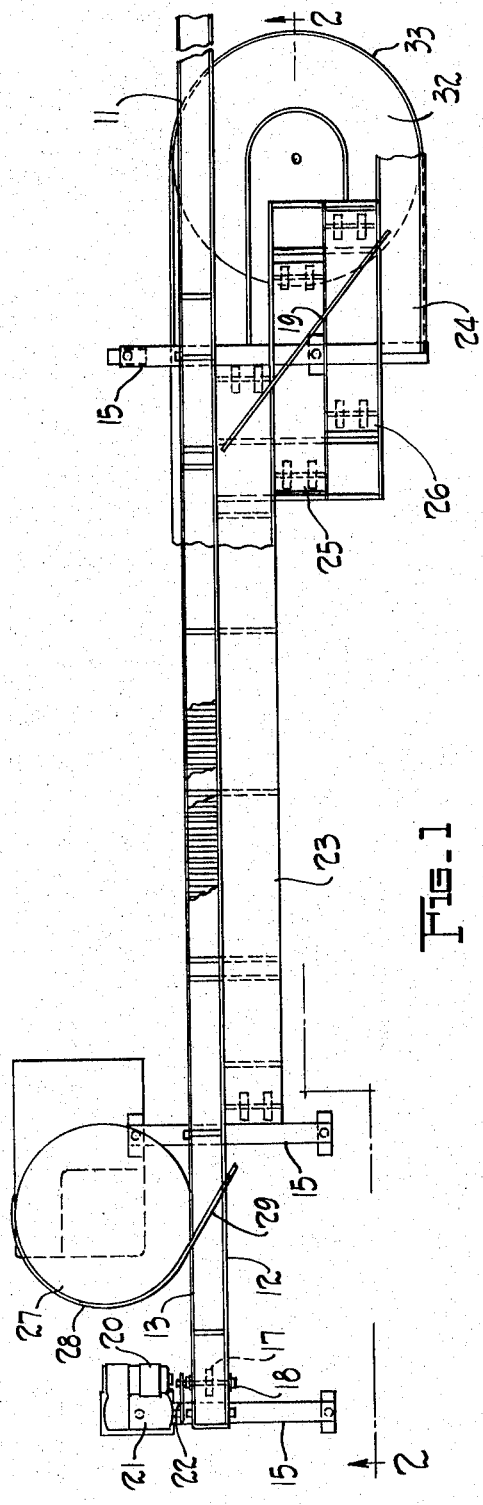
FIGURE 1 is a plan view of apparatus embodying the present invention.
Figure 2:
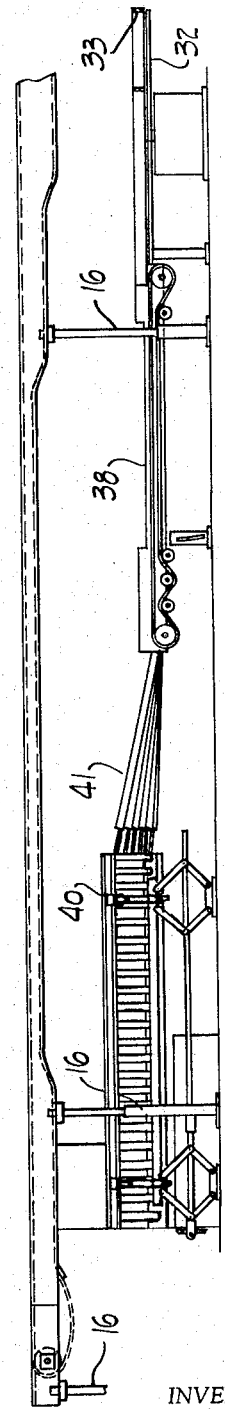
FIGURE 2 is a view taken along line 2—2 of FIGURE 1.
Figure 5:
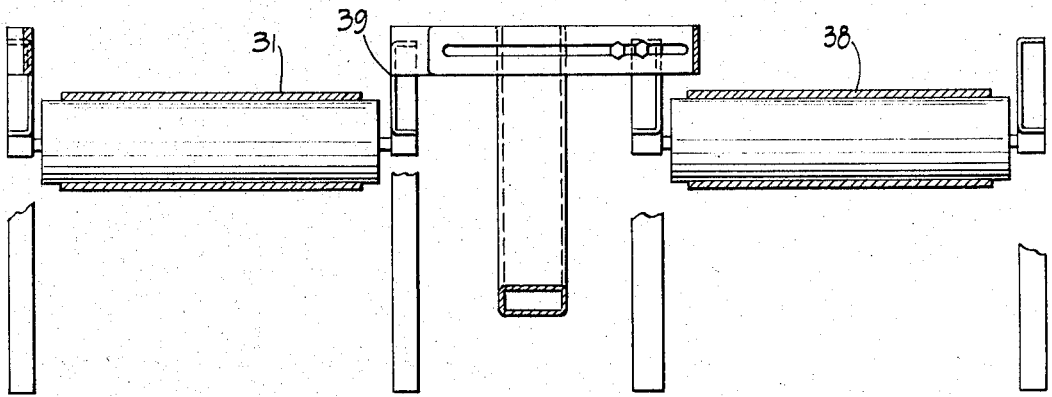
FIGURE 5 is an enlarged sectional view taken along line 5—5 of FIGURE 3.
Figure 6:
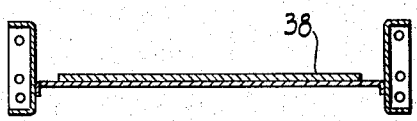
FIGURE 6 is an enlarged sectional view taken along line 6—6 of FIGURE 4.
Figure 7:
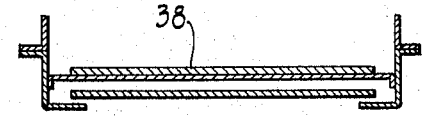
FIGURE 7 is an enlarged sectional view taken along line 7—7 of FIGURE 4.
Figure 8:
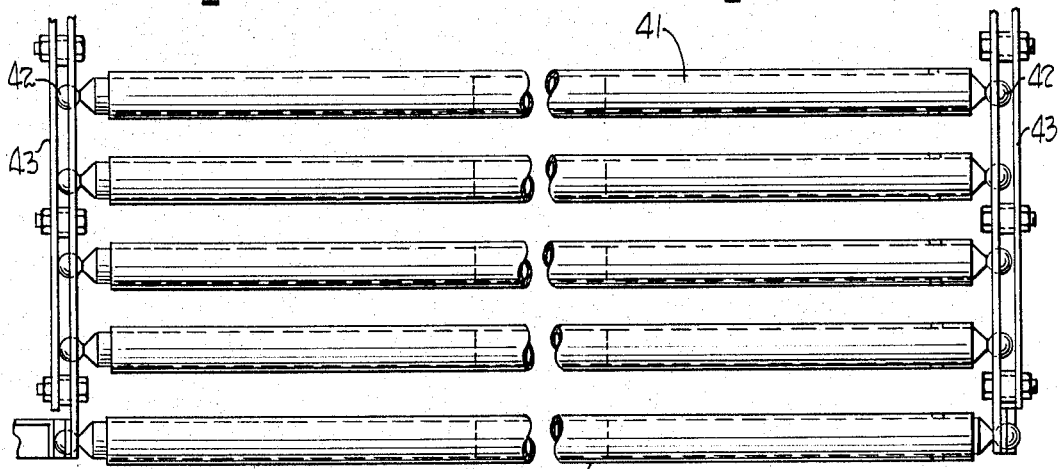
FIGURE 8 is an enlarged plan view showing a portion of the apparatus of the invention.
Figure 9:
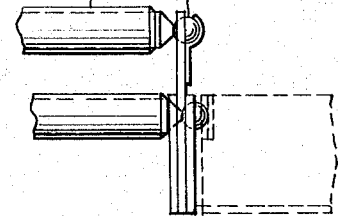
FIGURE 9 is a sectional view taken along line 9—9 of FIGURE 8.
Figure 13:
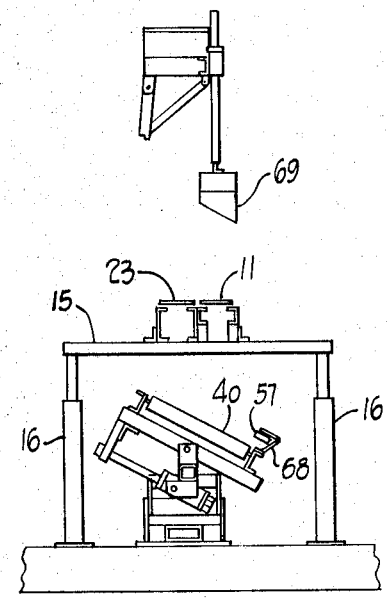
FIGURE 13 is a sectional view taken along line 13—13 of FIGURE 4.

As shown in the drawings, one form of apparatus of the invention comprises upright supports 16 having transverse horizontal supports 15 secured thereto on which are mounted longitudinal rail members 12 and 13.

A conveyor belt 11 is positioned between members 12 and 13 and carried at one end by a sprocket 17 mounted on a shaft 18 disposed between the members 12 and 13. The opposite end of belt 11 is carried by a sprocket and shaft (not shown) similar to sprocket 17 and shaft 18. Conveyor belt 11 is driven by a motor 20 connected to shaft 18 through a suitable drive mechanism including a speed control 21 and a chain 22 connecting the speed control to the shaft.

Adjacent to belt 11 is a second conveyor belt 23 operating in a reverse direction. Near the discharge end of belt 23 are positioned shorter belts 25 and 26 which connect belt 23 with a reject conveyor belt 24. A guide rail 19 is positioned diagonally across belts 23, 24, 25 and 26.

Figure 14:
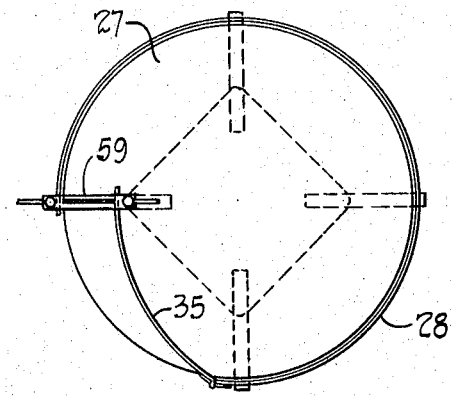
FIGURE 14 is an enlarged plan view of a portion of the apparatus of the invention.
Figure 15:
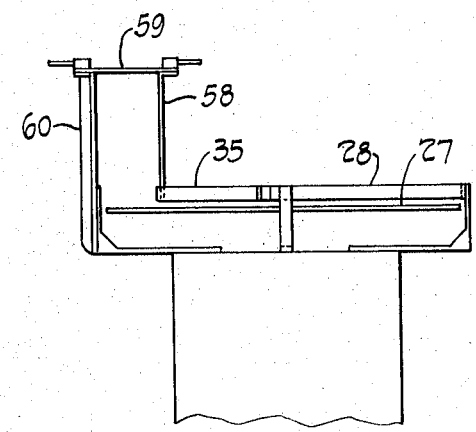
FIGURE 15 is a side elevation of the apparatus shown in FIGURE 14.

Alongside conveyor belt 11 near the discharge portion thereof is positioned an accumulator comprising a horizontally positioned rotatable disc 27 with a peripheral rail 28 having an extension 29 which is positioned above and across belt 11 at an angle thereto. As shown in FIGURES 14 and 15, at the opposite end of peripheral rail 28 is connected an adjustable rail 35. Rail 35 has an upwardly extending rod 58 near its free end. Rod 58 extends through a slot of a guide 59 which is disposed above disc 27 on a vertical support 60.

Below the glassware conveyor belt 11 is a carton conveying system comprising belts 30 and 31 and a carton orienting turnaround including a rotatable disc 32 having a peripheral guide rail 33 and an inside guide rail 34. Advantageously, rail 34 and its extension 39 are adjustable for different size cartons. A plate 36 is positioned between belt 31 and disc 32 to facilitate transfer of cartons to the disc. Likewise, a second plate 37 is positioned at the discharge point of disc 32 to a belt 38. Belts 30, 31 and 38 together with disc 32 may be driven, as shown in the drawings, by a common drive including a motor 42.

At the end of belt 38 is disposed a series of longitudinally positioned, telescoping rods 41 which connect belt 38 to an adjustable conveyor 40. Rods 41 have ball joints 42 adjustably connected to the ends thereof, which joints are mounted in guide slots 43 to permit movement of the rods with respect to each other.

Belt 38 is mounted so that the discharge end thereof may be raised and lowered. Since one end of each of the rods 41 is connected to the conveyor structure on which belt 38 is carried, raising and lowering of the discharge end of belt 38 will correspondingly change the position of the ends of rods 41 adjacent thereto.

The opposite ends of rods 41 are connected to a roller conveyor 40 which permits transverse tilting as well as raising and lowering thereof. The raising and lowering of conveyor 40 may be accomplished by a suitable scissors jack arrangement such as shown in FIGURES 10–12. The jack comprises a rotatable screw 45 which engages traveling nuts 46. The traveling nuts 46 in turn are pivotally connected to links 49 which are connected to a lower channel 47 and an upper channel 48. Pivotally connected to channel 48 are threaded bushings 51 which engage rotatable screws 50. Also, pivotally connceted to channel 48 is a sleve 54 in which a rotatable screw 53 is disposed. Screw 53 engages a threaded opening 55 in a cross member 56 which is secured to bushings 51. Wheels 57 are mounted along one edge of conveyor 40 on supports 68.

In the operation of the apparatus of the invention, glassware is advanced by conveyor belt 11 from right to left as shown in FIGURE 1 of the drawings. The ware is adavntageously moved as a single line and may be undergoing transfer from a lehr conveyor or an unscrambling device or an automatic inspection device, none of which are shown in the drawings. As the ware is advanced to the inspection station, it is visually inspected by individuals positioned alongside the belt. The defective ware rejected by the inspectors is pushed onto adjacent conveyor belt 23 and travels therealong until it is forced across belts 25 and 26 onto belt 24 by guide rail 19.

Ware considered acceptable by the inspectors is lifted from belt 11 and inserted in cartons on conveyor 40. Empty cartons are brought into position for packing below belt 11 by belts 30 and 31 which advance the cartons across plate 36 and onto rotating disc 32 which discharges the cartons onto plate 37 from which they are carried onto conveyor belt 38. The cartons on conveyor belt 38 then pass onto longitudinal rods 41 and from the rods onto conveyor 40. While rods 41 do not move the cartons onto conveyor 40, the advancement of succeeding cartons by the rotation of disc 32 and the movement of belt 38 forces the cartons disposed on rods 41 to move onto conveyor 40.

The position of conveyor 40 may be raised and lowered and tilted a swell as transversely adjusted for cartons of different sizes and shapes. The raising and lowering of conveyor 40 is effected by the movement of screw 45 of the scissors jack, while transverse movement is accomplished by the rotation of screws 50 with respect to bushings 51 which are pivotally connected to the conveyor. The tilting of conveyor 40 is accomplished by the rotation of screw 53 in cross member 56. Advantageously, vertical, transverse and rotary movement of conveyor 40 may be effected by controlling the operation of screws 45, 50 and 53 through appropriate switches and circuitry. A light source 69 may be positioned above belt 11 to facilitate inspection of the ware moving thereon.

As each carton is moved into position on conveyor 40, the inspector lifts acceptable ware from belt 11 and packs it into the carton. When the carton is full, it is carred by conveyor 40 and succeeding conveyors (not shown) to a shipping station. Depending upon the speed at which the ware is moving on conveyor belt 11 and the speed at which the cartons are moving into position on conveyor 40, it may be advantageous to operate the carton conveying system intermittently rather than continuously. Under such operating conditions, conveyor 40 may be freely movable rollers, wheels, etc. with the advancement of cartons thereon being effected by the force exerted by succeeding cartons as they are advanced on driven disc 32 and belt 38. Intermittent operation of disc 32 and/or belt 38 may be controlled by the inspector at the inspecting station through the use of appropriate switches and circuitry, and advantageously may be controlled by a foot switch positioned near the inspector.

To efficiently use the time of the inspectors at the inspection station and to reduce the number of inspectors to a minimum, the apparatus of the invention includes an accumulator mechanism with a rotatable disc 27. Thus, during periods in which the inspector at the inspection station cannot effectively inspect all of the ware moving along belt 11, the inspector will handle the pieces of ware that can be effectively inspected and allow the remaining ware to move along the belt until it is forced onto disc 27 by rail 29. As the ware is moved by disc 27, it contacts peripheral guide rail 28, and then adjustable rail 35 which forces the ware toward the center of the disc. The position of guide rail 35 may be adjusted so as to permit ware of various sizes to move onto disc 27 without interference from the ware already on the disc.

During periods of reduced work loads or shutdowns of the forming, annealing or other earlier operations, the inspector or inspectors may move to the accumulator to inspect the ware which has collected on disc 27. In this way, the time of each inspector is utilized more efficiently so that only a minimum number of inspectors are required.

The above description shows that the present invention not only overcomes the difficulties and shortcomings of previous glassware inspection and packing methods and apparatus, but in addition provides a new and improved method and apparatus which permit a reduction in the number of inspectors required while retaining a high degree of flexibility in the operations. Moreover, the apparatus of the invention affords troublefree operation at high rates of speed over long periods of time.

It will be apparent from the above discussion that various modifications in the specific procedures and apparatus described herein may be made within the scope of the invention. Therefore, the invention is not intended to be limited to the particular procedures and apparatus described in detail except as may be required by the following claims.

What is claimed is:

1. Apparatus for handling glassware and cartons therefor, comprising: glassware handling means including glassware transfer means and a ware accumulator adjacent said glassware transfer means near the discharge portion thereof; first carton transfer means; second carton transfer means disposed adjacent to said glassware transfer means and movable in substantially the same direction as said glassware transfer means; rotatable carton orienting means positioned between said first and second transfer means; said second carton transfer means being adjustable to receive cartons of different sizes and shapes; and a transfer station whereat ware is manually removed from said glassware handling means and placed in cartons on said second carton transfer means.

2. Apparatus for handling glassware and cartons therefor, comprising: glassware handling means including glassware transfer means and a ware accumulator adjacent said glassware transfer means near the discharge portion thereof; first carton transfer means; second carton transfer means disposed below said glassware transfer means and movable in substantially the same direction as said glassware transfer means; carton orienting means including a rotatable disc positioned between said first and second transfer means; said second carton transfer means being adjustable to receive cartons of different sizes and shapes; and a transfer station whereat ware is manually removed from said glassware handling means and placed in cartons on said second carton transfer means.

3. Apparatus for handling glassware and cartons therefor, comprising: glassware handling means including glassware transfer means and a ware accumulator adjacent said glassware transfer means near the discharge portion thereof; first carton transfer means; second carton transfer means disposed below said glassware transfer means and movable in substantially the same direction as said glassware transfer means; rotatable carton orienting means positioned between said first and second transfer means; actuating means for changing the position of said second carton transfer means; and an inspection station whereat ware is inspected and acceptable ware manually removed from said glassware handling means and placed in cartons on said second carton transfer means.

4. Apparatus for handling glassware and cartons therefor, comprising: glassware handling means including glassware transfer means and a ware accumulator adjacent said glassware transfer means near the discharge portion thereof; first carton transfer means; second carton transfer means disposed below said glassware transfer means and movable in substantially the same direction as said glassware transfer means; rotatable carton orienting means positioned between said first and second transfer means; switch means for controlling said carton orienting means; said second carton transfer means being adjustable to receive cartons of different sizes and shapes; and a transfer station whereat ware is manually removed from said glassware handling means and placed in cartons on said second carton transfer means.

5. Apparatus for handling glassware and cartons therefor, comprising: glassware handling means including glassware transfer means and a ware accumulator adjacent said glassware transfer means near the discharge portion thereof; first carton transfer means; second carton transfer means disposed below said glassware transfer means and movable in substantially the same direction as said glassware transfer means; carton orienting means including a rotatable disc; switch means for controlling said carton orienting means; said second carton transfer means being adjustable to reecive cartons of different sizes and shapes; and a transfer station whereat ware is manually removed from said glassware handling means and placed in cartons on said second carton transfer means.

6. Apparatus for handling glassware and cartons therefor, comprising: glassware handling means including glassware transfer means and a ware accumulator adjacent said glassware transfer means near the discharge portion thereof; first carton transfer means; second carton transfer means disposed below said glassware transfer means and movable in substantially the same direction as said glassware transfer means; carton orienting means including a rotatable disc; actuating means including means for effecting vertical, transverse and rotary movement of said second carton transfer means; and an inspection station whereat ware is inspected and acceptable ware manually removed from said glassware handling means and placed in cartons on said second carton transfer means.

7. Apparatus for handling glassware and cartons therefor, comprising: glassware handling means including glassware transfer means and a ware accumulator adjacent said glassware transfer means near the discharge portion thereof; first carton transfer means; second carton transfer means disposed adjacent to said glassware transfer means; rotatable carton orienting means positioned between said first and second transfer means; and a transfer station whereat ware is manually removed from said glassware handling means and placed in cartons on said second carton transfer means.

References Cited by the Examiner

UNITED STATES PATENTS

| | | | |
|---|---|---|---|
| 1,609,802 | 12/1926 | Ekstrom | 198—24 |
| 1,867,771 | 7/1932 | Slama | 198—209 |
| 1,998,912 | 4/1935 | Troy | 198—84 |
| 2,516,499 | 7/1950 | Albright | 198—181 |
| 2,793,747 | 5/1957 | Pridy | 209—125 |
| 2,956,382 | 10/1960 | Wardell | 53—35 |
| 2,971,634 | 2/1961 | Wilde | 198—181 |
| 3,101,475 | 8/1963 | Petersen | 198—84 |
| 3,220,154 | 11/1965 | Schoot | 53—35 |

ANDRES H. NIELSEN, *Primary Examiner.*

RICHARD E. AEGERTER, EVON C. BLUNK,
*Examiners.*